(12) United States Patent
Horiuchi et al.

(10) Patent No.: US 7,771,886 B2
(45) Date of Patent: Aug. 10, 2010

(54) FUEL CELL

(75) Inventors: Michio Horiuchi, Nagano (JP);
Shigeaki Suganuma, Nagano (JP); Misa Watanabe, Nagano (JP); Yasue Tokutake, Nagano (JP)

(73) Assignee: Shinko Electric Industries Co., Ltd., Nagano (JP)

( * ) Notice: Subject to any disclaimer, the term of this patent is extended or adjusted under 35 U.S.C. 154(b) by 923 days.

(21) Appl. No.: 11/326,898

(22) Filed: Jan. 6, 2006

(65) Prior Publication Data

US 2006/0154135 A1  Jul. 13, 2006

(30) Foreign Application Priority Data

Jan. 7, 2005  (JP)  ............... 2005-002242

(51) Int. Cl.
*H01M 4/00* (2006.01)
(52) U.S. Cl. .............. 429/508; 429/405; 429/452; 429/497; 429/507
(58) Field of Classification Search .......... 429/30
See application file for complete search history.

(56) References Cited

U.S. PATENT DOCUMENTS 5,989,741 A * 11/1999 Bloomfield et al. .......... 429/32
7,232,626 B2 * 6/2007 Jacobson et al. .......... 429/128
2006/0099482 A1 * 5/2006 Scott et al. .......... 429/40

FOREIGN PATENT DOCUMENTS

| EP | 1261060 | 11/2002 |
|---|---|---|
| EP | 1414094 | 4/2004 |
| EP | 1596457 | 11/2005 |
| GB | 2400723 | 10/2004 |
| JP | 6-196176 | 7/1994 |
| WO | 03/092046 | 11/2003 |
| WO | 2004/021486 | 3/2004 |
| WO | 2004/049484 | 6/2004 |

OTHER PUBLICATIONS

Blum et al, *Overview of the Development of Solid Oxide Fuel Cells at Forschungszentrum Juelich*, Electrochemical Society Proceedings, vol. 2005-07, pp. 39-47.
Tsai et al, *Fuel Cell Anode Performance*, J. Electrochem. Soc., vol. 145, No. 5, May 1998, pp. 1696-1701.
Yang et al, *Selection and Evaluation of Heat-Resistant Alloys for SOFC Interconnect Applications*, Journal of the Electrochemical Society, 150 (9), 2003, pp. A1188-A1201.

(Continued)

*Primary Examiner*—Dah-Wei D Yuan
*Assistant Examiner*—Patricia Davis
(74) *Attorney, Agent, or Firm*—Locke Lord Bissell & Liddell, LLP

(57) ABSTRACT

A solid oxide fuel cell comprising a fuel cell unit which comprises an anode layer made of an electrically conducting mesh and an anode-forming material carried by this mesh, a cathode layer made of an electrically conducting mesh and a cathode-forming material carried by this mesh, and a solid electrolytic layer in the form of a thin film arranged between and supported by the anode layer and the cathode layer.

19 Claims, 9 Drawing Sheets

OTHER PUBLICATIONS

Hibino et al, *A Low-Operating-Temperature Solid Oxide Fuel Cell in Hydrocarbon-Air Mixtures*, Science, vol. 288, Jun. 16, 2000, pp. 2031-2033.

Zha, et al, *GDC-Based Low-Temperature SOFCs Powered by Hydrocarbon Fuels*, Journal of the Electrochemical Society, 151 (8), 2004, pp. A1128-A1133.

Sato et al, *Electrocatalytic Activity of $Co_{0.5}Ni_{0.5O}$ Particles for the Anodic Oxidation of Methane*, Materials Transactions, JIM, vol. 41, No. 12, 2000, pp. 1621-1625.

Robert, et al, *Anode Supported Solid Oxide Fuel Cells with a Thick Anode Substrate*, Proceedings of the $5^{th}$ European Solid Oxide Fuel Cell Forum, Jul. 1-5, 2002, Lucerne, Switzerland, vol. 1, pp. 116-122.

Sakai, *Interconnect Materials of Planar Solid Oxide Fuel Cell*, Ceramics Japan, vol. 30, No. 4, 1995, pp. 329-332. [In Japanese].

$9^{th}$ SOFC Forum, Proceeding, 10B, entitled "Electrochemical Characteristics of Tubular Flat Plate Type SOFCs" with English Language Abstract, Dec. 14, 2000, pp. 37-40.

European Search Report issued Mar. 6, 2007 for European patent application No. 06250012.9-1227.

* cited by examiner

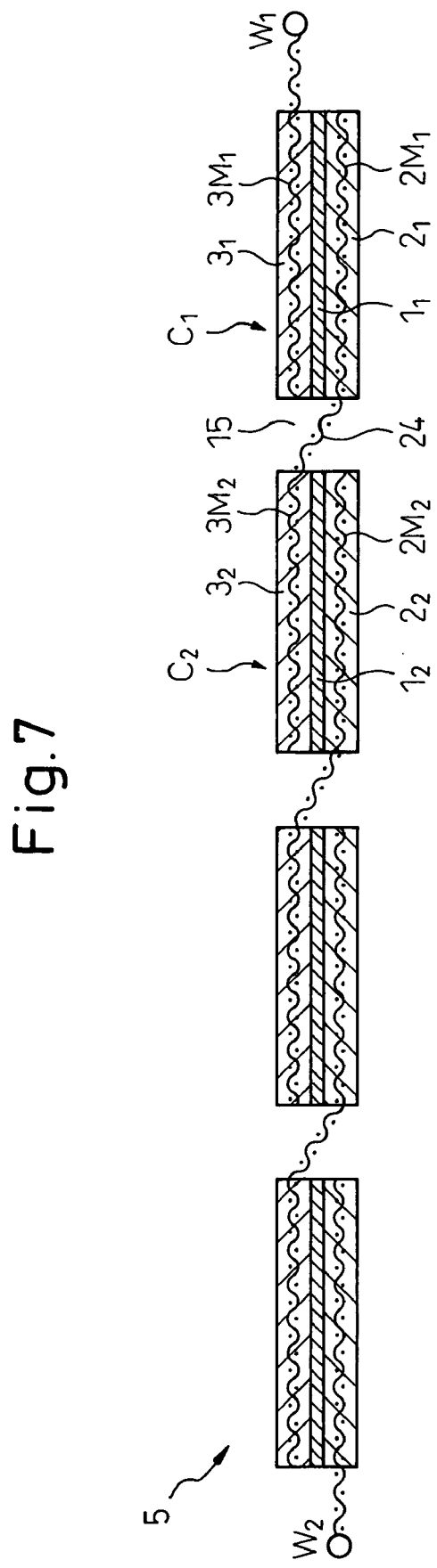

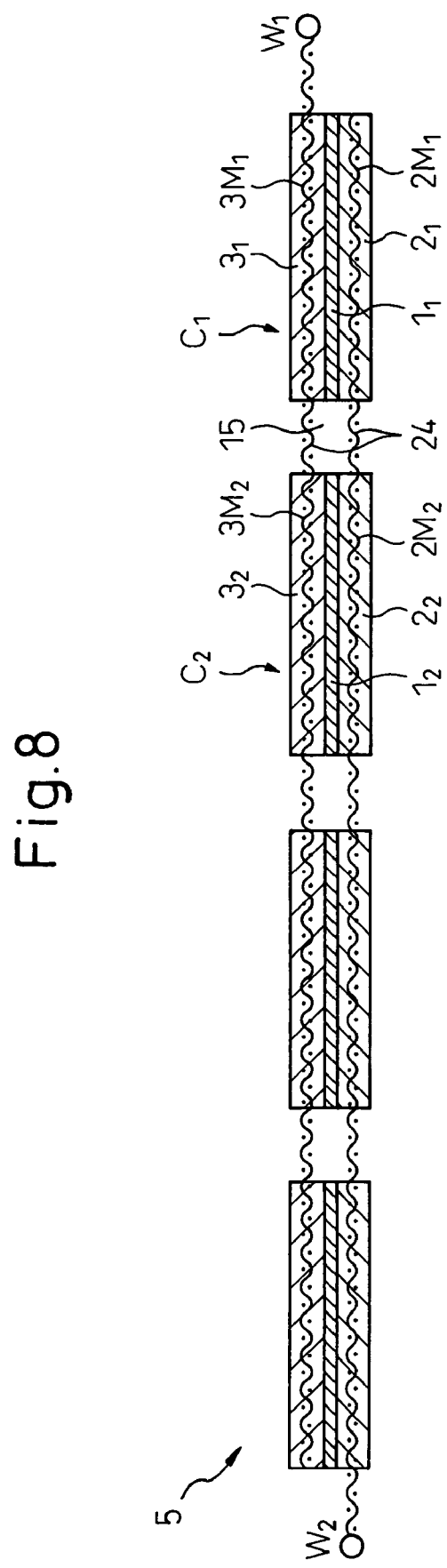

FUEL CELL

BACKGROUND OF THE INVENTION

1. Field of the Invention

The present invention relates to a fuel cell. More specifically, the invention relates to a solid electrolyte-using or solid oxide fuel cell that can be advantageously put into practice in a system which generates electricity by arranging a fuel cell unit in the flame or near the flame so as to be exposed to the flame, or in a system which generates electricity relying upon a potential difference that takes place between an anode layer and a cathode layer by arranging the fuel cell unit in an atmosphere of a mixed fuel gas of a gaseous fuel and oxygen or an oxygen-containing gas. Particularly, the fuel cell of the invention features a high resistance against thermal shock, a high generation density per volume, is small in size, light in weight, can be designed permitting a high degree of freedom, can be excellently produced and at a low cost, and can be advantageously utilized as a generator in a variety of fields.

2. Description of Related Art

Fuel cells have heretofore been developed and put into practice, as power generation means which cause little pollution as substitutes for thermal power plants or as sources of electric energy for electric cars. The cells can replace engines burning gasoline or the like as a fuel. In recent years, in particular, extensive study has been aimed at providing fuel cells having high efficiency at low cost.

As is widely known, the fuel cells have been provided in a variety of generation types. Among them, a fuel cell of the type of using a solid electrolyte, i.e., a solid oxide fuel cell (SOFC) is expected to offer the highest generation efficiency, further featuring a long life and a low cost, and is drawing attention in various fields.

According to one example, the solid electrolytic fuel cell uses a fired product of stabilized zirconia to which yttria ($Y_2O_3$) has been added as a solid electrolytic layer of the oxygen-ion conduction type. A cathode layer is formed on one surface of the solid electrolytic layer, an anode layer is formed on the opposite surface thereof, oxygen or an oxygen-containing gas is supplied to the side of the cathode layer, and a fuel gas such as methane is supplied to the anode layer. A fuel cell unit comprising the solid electrolytic layer, the anode layer and the cathode layer is contained in a chamber to complete a fuel cell.

In this fuel cell, oxygen ($O_2$) supplied to the cathode layer is ionized into oxygen ions ($O^{2-}$) in a boundary between the cathode layer and the solid electrolytic layer, the oxygen ions are conducted to the anode layer through the solid electrolytic layer, reacted with, for example, a methane ($CH_4$) gas that is supplied to the anode layer and, finally, form water ($H_2O$) and carbon dioxide ($CO_2$). In this reaction, the oxygen ions release electrons producing a potential difference between the cathode layer and the anode layer. By attaching lead wires to the cathode layer and to the anode layer, therefore, the electrons in the anode layer flow to the side of the cathode layer through the lead wire generating electricity as a fuel cell. However, the fuel cell of this so-called separate chamber type is, usually, operated at a temperature which is as high as about 1000° C. Besides, the cathode layer side is exposed to an oxidizing atmosphere and the anode layer side is exposed to a reducing atmosphere making it difficult to stably use the fuel cell unit over extended periods of time and, hence, it lacks durability.

SCIENCE, Vol. 288 (2000), pp. 2031-2033, as schematically shown in FIG. 1, suggests a fuel cell of the so-called single chamber type containing, in a chamber 110, a fuel cell unit 106 that has a cathode layer 102 and an anode layer 104 formed on both surfaces of a solid electrolytic layer 100. In this fuel cell, a mixed fuel gas which is a mixture of a methane gas and oxygen is introduced into the chamber 110 through a conduit 110a, whereby the fuel cell unit 106 generates an electromotive force due to the action of the mixed fuel gas. The exhaust gas, after use, is exhausted out of the chamber through a conduit 110b. In the case of this fuel cell, however, only one fuel cell unit is contained in the chamber, and the voltage that is taken out is not high enough for practical use.

In the above fuel cell, the fuel cell unit is contained in a chamber. There has further been proposed a fuel cell of the so-called direct flame type which generates electricity by arranging the solid oxide fuel cell unit in the flame or near the flame to maintain the fuel cell unit at its operation temperature by the heat of the flame, in an attempt to simplify the structure, to decrease the size and weight and to decrease the cost. In the fuel cell of this kind, in particular, the electromotive time can be shortened owing to the direct use of the flame.

As an example of the solid oxide fuel cell which utilizes the flame, Japanese Unexamined Patent Publication (Kokai) No. 6-196176 (JP-A-6-196176) discloses a fuel cell provided with a tubular solid oxide fuel cell. FIG. 2 illustrates an example of the combustion device therefor, wherein a fuel cell unit 203 comprises a zirconia solid electrolytic pipe 212a, an anode layer 222 which is a fuel electrode formed on the outer side of the pipe 212a, and a cathode layer (not shown) which is an air electrode formed on the inner side of the pipe 212a. The solid oxide fuel cell unit 203 is so installed that the anode layer 222 is exposed to a reducing flame portion 223 of a flame 202 produced by the combustion device 201 to which the fuel gas is supplied. Thus, by installing the fuel cell unit 203 in the flame 202, electricity can be generated by utilizing, as a fuel, radical components existing in the reducing flame.

In the present invention, as will be described later in detail, the structure for supporting the fuel cell plays an important role. For easy comprehension of a novel support structure of the present invention, a representative example of a conventional electrode-supported fuel cell will be summarized below.

A structure of the flat plate type has been studied as a step toward putting the solid oxide fuel cell into a practical use. Namely, the cell has a three-layer structure of cathode/solid electrolyte/anode, and electricity is collected from the cell and the gas is separated by an interconnecting member (separator) having such a channel structure that the air flows toward the cathode side and the fuel flows toward the anode side. Therefore, the interconnecting member must be electron conductive and gas tight. These structures have been disclosed in, for example, Ceramic, 30 (1995), No. 4, pp. 329-332, and Journal of the Electrochemical Society, 150(9), A1188A-A1201 (2003).

On the other hand, the fuel cell unit, too, must have mechanical strength from the standpoint of the handling thereof. So far, in general, a ceramic substrate of zirconia or ceria is prepared to serve as a solid electrolytic layer, and a cathode layer and an anode layer are formed on both surfaces thereof to prepare a cell. The solid electrolytic layer requires gas tightness for preventing the mixing of the fuel and the air, while the cathode layer and the anode layer must have porosities of not smaller than a predetermined value such that the reaction species can be diffused to a sufficient degree. Therefore, the above production method is desirable even from the standpoint of realizing a difference in the densities thereof (first, the electrolyte is fired at a high temperature and, after an electrode material is applied thereon, is additionally fired at a lower temperature to form an electrode layer of a low density on the electrolytic layer of a high density).

Forming the electrolytic layer in a decreased thickness is effective in decreasing the internal resistance of the fuel cell unit, and it has been studied to form the electrolyte at a thickness of several tens of microns. In this case, a sufficient degree of strength is not obtained by the electrolytic layer as a matter of course and, hence, at least one of the electrode layer must be thickly formed to maintain a strength greater than a predetermined level. For this reason, there has been employed a structure for supporting either the anode (fuel electrode) or the cathode (air electrode). Joep Hujismans, in the Fifth European Solid Oxide Fuel Cell Forum, Proceedings Vol. 1, 2002 July, pp. 116-117 related to Proceedings of an International Academy related to SOFC, 2002, reports and discusses, in a session, whether the electrolyte or the electrode should be supported. A first theory briefly describes the background. Further, the Journal of the Electrochemical Society, 151(8), A1128-A1133 (2004) introduces an experiment on an anode-supported cell, and the Ninth Meeting of Reading Study Papers on SOFC, Proceedings, December, 2000, SOFC Academy, pp. 37-40 introduces an experiment on a cathode-supported cell.

As described above, the portion supporting the cell supports either the electrolytic layer or the electrode layer. In experiments, however, a metal mesh is used in many cases not for the purpose of support but for the purpose of electric connection. A single cell is evaluated on an experimental level not relying on a large-scale structure that uses the above interconnecting member but, usually, by drawing wires from the electrodes in a simple manner. Though this has not been closely described in recent literature, attempts have been made to connect lead wires such as of silver, gold or platinum to the mesh and bury them in the electrode material layer. J. Electrochem. Soc., Vol. 145, No. 5, 1998 May, pp. 1696-1701 discloses an example in which a platinum mesh is connected to the electrode layer by using an anode material (Ni-cermet), and shows in cross section the structure of part of the layers. Materials Transactions, JIM, Vol. 41, No. 12(2000), pp. 1621-1625 teaches a similar connection in which the electrode has a diameter of 13 mm while the platinum mesh that is used has a size of 2 mm square. The metal lead can be connected only to the electrode layer without using the mesh but has a very low mounting strength. Therefore, a mesh is used in many cases. This is done when the single cell is evaluated on an experimental level. On a practical level, however, an interconnecting member is used.

SUMMARY OF THE INVENTION

It is an object of the present invention to improve the above-mentioned defects inherent in the conventional fuel cells and, particularly, to enhance the durability, resistance against thermal shocks and volume generation density of a single-chamber fuel cell and of a direct-flame fuel cell, to decrease the size, weight and cost, to enhance the degree of freedom for designing the fuel cell and to improve the productivity.

Another object of the present invention is to provide, particularly, a direct-flame fuel cell which shortens the electromotive time, decreases the size and weight of the fuel cell as a result of simplifying the structure, and easily achieves a reduction in cost.

The above objects as well as other objects of the invention will be easily understood from the following detailed description.

In order to achieve the above objects, the present inventors have conducted a keen study and have discovered that forming the solid electrolytic layer in the form of a film or a layer having a thickness as small as possible is effective in producing a solid oxide fuel cell while letting the anode layer and the cathode layer support the fuel cell unit though the self-supported fuel cell unit was so far completed by supporting the anode layer and the cathode layer by increasing the thickness thereof or by using a solid electrolytic layer in combination with a support member, and have thus completed the present invention.

That is, according to the present invention, there is provided a solid oxide fuel cell comprising a fuel cell unit which comprises an anode layer made of an electrically conducting mesh and an anode-forming material carried by this mesh, a cathode layer made of an electrically conducting mesh and a cathode-forming material carried by this mesh, and a solid electrolytic layer in the form of a thin film arranged between and supported by the anode layer and the cathode layer.

As will be understood from the following detailed description, the present invention is concerned with a single-chamber fuel cell and a direct-flame fuel cell, wherein the anode layer and the cathode layer are formed by using an electrically conducting mesh as a carrier thereby to support the solid electrolytic layer, which is a thin film, by these electrode layers. Quite unexpectedly, the fuel cell features improved durability, resistance against thermal shocks and volume generation density, making it possible to realize the fuel cell in a small size, at a reduced weight and at a low cost, enhancing the degree of freedom for designing the fuel cells and improving productivity of the fuel cells.

In the direct-flame fuel cell, the electromotive time can be shortened by the use of the flame, the structure can be simplified and, hence, the device can be easily realized in a small size, at a reduced weight and at a low cost.

In the direct-flame fuel cell, further, the wall of the combustion chamber is defined by the fuel cell unit, and a solid fuel is used to achieve a sufficient amount of electric power and electromotive force while guaranteeing continuity in the electromotive force. Further, the size of the fuel cell can be arbitrarily varied depending upon the amount of treating the fuel. Accordingly, the fuel cell can be offered to meet the needs in a variety of fields.

In the direct-flame fuel cell, further, a gas fuel is used, the wall of the combustion chamber is defined by the fuel cell unit, the fresh air supplied into the combustion chamber is guided around the outer periphery of the fuel cell unit and is heated to maintain the oxygen partial pressure on the cathode side on an atmospheric level at all times and to achieve a high output state maintaining stability. According to this method, the fresh air is pre-heated and is, then, supplied to the combustion chamber so as to face to the flame on the bottom of the combustion chamber to effectively utilize the supplied air for the cathode reaction. In the combustion system, further, there occurs a forced air stream, which is uniform, to lower the over-voltage due to diffusion.

In the present invention, further, the fuel cell is constituted in the form of fuel cell units. Namely, two or more fuel cell units are incorporated in a casing to provide a fuel cell with a high output despite of its small and compact size by effectively utilizing the space of the fuel cell.

In the case of the single-chamber fuel cell using a mixed fuel gas, on the other hand, a plurality of fuel cell units are arranged being stacked one upon the other in a chamber to take out a desired voltage higher than that of when a single fuel cell unit is contained. In the fuel cell of this structure, further, a space formed in the chamber is filled with a particular filler to prevent an undesired explosion of the mixed fuel gas or to prevent carbonization of the fuel.

BRIEF EXPLANATION OF THE DRAWINGS

FIG. 7 is a sectional view illustrating another preferred embodiment of the fuel cell units used in the fuel cell of the present invention, FIG. 8 is a sectional view illustrating a further preferred embodiment of the fuel cell units used in the fuel cell of the present invention.

DESCRIPTION OF THE PREFERRED EMBODIMENTS

Figure 1:
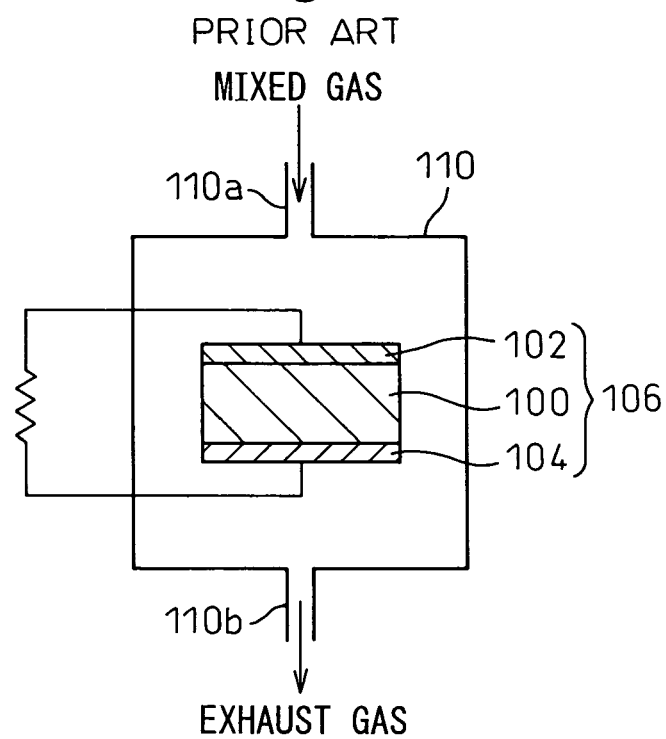
FIG. 1 is a sectional view illustrating a conventional single-chamber fuel cell.
Figure 2:
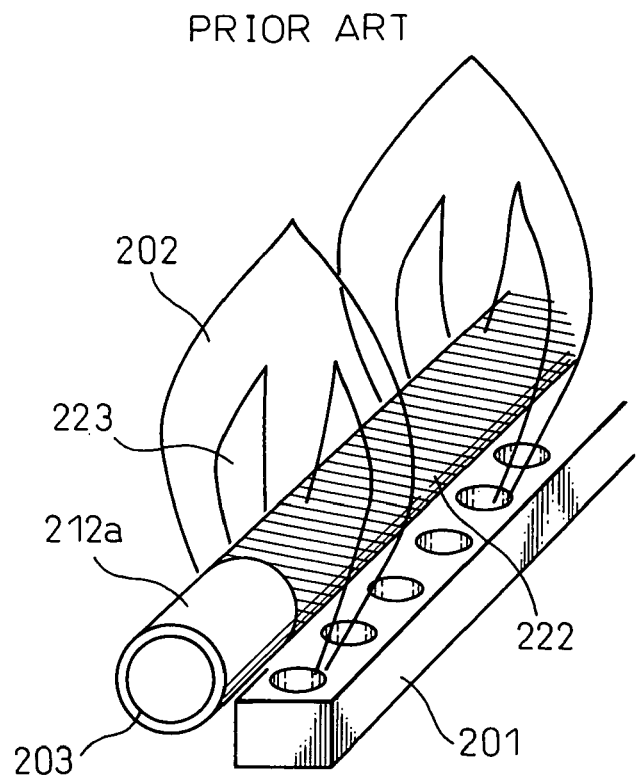
FIG. 2 is a perspective view illustrating a conventional direct-flame fuel cell.

The fuel cell of the invention can be advantageously carried out in different embodiments. The fuel cell of the invention will now be described by way of preferred embodiments to which only, however, the invention is in no way limited.

The fuel cell of the invention has a feature, particularly, on the constitution of the fuel cell unit. That is, the fuel cell unit used in the fuel cell of the present invention comprises:

(1) an anode layer (fuel electrode) made of an electrically conducting mesh and an anode-forming material carried by the mesh, (2) a cathode layer (air electrode) made of an electrically conducting mesh and a cathode-forming material carried by the mesh, and (3) a solid electrolytic layer in the form of a thin film arranged between and supported by the anode layer and the cathode layer.

In the present invention, in particular, it is important that the anode layer and the cathode layer are supported by an electrically conducting mesh and that the solid electrolytic layer in the form of a thin film is formed between the anode layer and the cathode layer. Here, the electrically conducting mesh used for supporting the anode layer and the cathode layer further works to improve the collection of electricity and to improve the mechanical strength in addition to exhibiting its function as a support member. Generally, further, the electrically conducting mesh has a higher heat conductivity than that of the electrode material or the solid electrolytic material, and contributes to equalizing the heat in the fuel cell unit and, as a result, to improving resistance against thermal shocks. The electrically conducting mesh can be made of a variety of electrically conducting materials in a variety of forms and sizes so far as it exhibits various functions as described above without adversely affecting the functions of the obtained fuel cell units. In determining the electrically conducting mesh that is to be used, however, it is necessary to take into consideration the balance of a coefficient of thermal expansion, between the cathode layer and the anode layer, and resistance against the heat. The "electrically conducting mesh" generally stands for an electrically conducting material which has a mesh structure or which is knitted so as to be imparted with a mesh structure. The electrically conducting mesh, however, may be a felt or an electrically conducting material of a similar structure if it exhibits the same function.

The electrically conducting mesh is, usually, a mesh of a metal material or a mesh of a carbonaceous material. If it is effective in improving, for example, the reinforcing function, these meshes may be used in two or more kinds in combination such as being overlapped one upon the other. When formed by knitting, the mesh can be in the form of, for example, a plain fabric, a twill, a twisted yarn fabric, a plain mat fabric or a reed screen fabric.

When the electrically conducting mesh is made of a metal material, though not limited thereto only, suitable examples thereof include platinum, iron, copper, nickel titanium or an alloy thereof, a stainless steel such as SUS 300s (304, 316, etc.) or SUS 400s (430, etc.), nichrome, Monel, Hastelloy and Inconel. Further, carbonaceous materials suited for forming the mesh may be a carbon fiber and a graphite fiber.

In the practice of the invention, the electrically conducting mesh can be used having various sizes of opening depending upon the use or the method of forming the anode layer and the cathode layer. The electrically conducting mesh has an opening size of, usually, about 80 to 500 mesh and, preferably, about 300 to 400 mesh.

Similarly, when the electrically conducting mesh is formed by knitting, the wire diameter of the electrically conducting mesh can be varied over a wide range depending upon the performance of the electrically conducting mesh and the method of knitting. The wire diameter of the electrically conducting mesh is, usually, about 0.02 to about 2.00 mm and, preferably, about 0.02 to about 0.04 mm.

Though the electrically conducting mesh can have various thicknesses, it is desired in the case of the present invention that the electrically conducting mesh has a thickness which occupies a substantial portion of the thickness of the anode layer and the cathode layer by taking into consideration that the electrically conducting mesh also works as a support member. In particular, it is desired that the thickness of the electrically conducting mesh occupies at least 30% and, particularly, at least 50% of the whole thickness of the anode layer or the cathode layer carried thereby. Usually, it is desired that the electrically conducting mesh has a thickness of about 50 to about 300 μm and, more desirably, a thickness of about 50 to about 100 μm.

The electrically conducting mesh can be used in various forms but usually has a rectangular shape by taking the workability and the form of the fuel cell unit into consideration. In putting the invention into practice, further, it is desired that the electrically conducting mesh further has an exposed region extending from the region of the anode layer or the cathode layer carried thereby. This is because the exposed region can be used as a terminal for connecting the lead wire and as means for connection to the neighboring fuel cell units.

In the practice of the invention, there is no particular limitation on the shape of the exposed portion of the electrically conducting mesh, and an optimum shape may be selected by taking the handling into consideration. When the anode layer and the cathode layer have rectangular shapes it is desired that the electrically conducting mesh extends from at least one side of the four sides to form an exposed region. The exposed portions of, for example, a rectangular shape can be advantageously worked to extend from the anode layer and the cathode layer.

The constitution of the fuel cell unit will now be described. As will be described below, the fuel cell unit may comprise a single cell member, or a combination of two or more sectionalized cell members. Each cell member basically includes the solid electrolytic substrate, and the anode layer and the cathode layer arranged in an opposing manner on the two main surfaces of the substrate. The anode layer and the cathode layer have the above electrically conducting mesh supporting them. Further, the anode layer and the cathode layer have lead wires connected thereto. The lead wires can be formed by using, for example, silver, gold or platinum.

In the practice of the invention, there is no particular limitation on the solid electrolytic layer which, therefore, can be formed by using the following known materials.

a) Zirconia ceramics such as YSZ (zirconia stabilized with yttria), ScSZ (zirconia stabilized with scandia), or those obtained by further doping the above zirconia with Ce or Al.

b) Ceria ceramics such as SDC (ceria doped with samaria), GDC (ceria doped with gadolia).

c) LSGM (lanthanum gallate), bismuth oxide ceramics.

It is desired that the solid electrolytic layer is made of a porous material. In the conventional fuel cell unit, the solid electrolytic layer was densely formed exhibiting, however, a low resistance against thermal shocks and developing cracks due to a sharp change in the temperature. According to the present invention, on the other hand, the solid electrolytic layer is porous and is not cracked even when it is subjected to a sudden change in the temperature, and heat cycles of a vigorous temperature differential by arranging it in the flame or near the flame to generate electricity as the direct-flame fuel cell, and exhibits improved resistance against thermal shock.

The porosity of the porous solid electrolytic layer can be widely varied. Various porosities can be imparted to the solid electrolytic layer by adding an arbitrary additive such as a pore-forming agent and, particularly, adjusting the kind of the powder of the pore-forming agent and the blending ratio thereof and, further, adjusting the firing conditions such as firing temperature, firing time and pre-firing. It is desired that the porosity of the solid electrolytic layer is usually about 10 to 60% and, more preferably, about 20 to about 40%. The resistance against the thermal shock is not markedly improved when the porosity of the solid electrolytic layer is smaller than 10% but is exhibited when the porosity is not smaller than 10%. This is because, when the solid electrolytic layer is porous, the thermal expansion due to the heating is presumably relaxed by voids.

In the conventional fuel cell unit, the solid electrolytic layer has a thickness greater than those of the anode layer and the cathode layer. Therefore, cracks in the solid electrolytic layer trigger cracks in the whole fuel cell unit causing it disintegrate. However, the solid electrolytic substrate that is formed porous, according to the present invention, advantageously avoids the above defects.

Besides, according to the present invention, the function for supporting the fuel cell unit does not rely upon the solid electrolytic layer. Therefore, the solid electrolytic layer need not be thickly formed, and there is no need to use the solid electrolytic layer in the form of a flat plate. That is, the solid electrolytic layer can, usually, be formed in a thickness smaller than the whole thickness of the anode layer or the cathode layer. The solid electrolytic layer has a thickness which is, usually, about 10 to about 100 µm and, preferably, about 20 to about 50 µm.

The solid electrolytic layer can be formed by using any technology that is commonly used for forming thin films and films. For example, a paste of a solid electrolytic material is applied in a predetermined pattern, dried and is fired to easily form a solid electrolytic layer. A printing method such as a screen printing method can be advantageously used for applying the paste. Concretely, the anode layer and the cathode layer supported by the electrically conducting mesh are formed, a paste of the solid electrolytic material is printed in a predetermined pattern on the surface of at least either one of these layers, followed by drying and firing after having been stacked to form a solid electrolytic layer. The anode layer and the cathode layer used here are those in the unfired state, and it is recommended to fire them at one time in the firing step of forming the solid electrolytic layer. Employment of the above green sheet processing makes it possible to strikingly shorten the process for producing the fuel cell unit, to improve the productivity and to lower the cost of production.

In the present invention, there is no particular limitation on the anode layer which, therefore, can be formed by using the following known materials.

a) Cermet of nickel and ceramics (SDC, GDC, YDC) of the type of zirconia stabilized with yttria, of the type of zirconia stabilized with scandia or of the type of ceria.

b) Sintered body comprising an electrically conducting oxide as a chief component (50 to 99% by weight)(electrically conducting oxide stands for, for example, nickel oxide in which lithium is solid-dissolved).

c) Materials of a) and b) above blended with a metal which is an element of the platinum group or an oxide thereof in an amount of about 1 to about 10% by weight.

Among the above materials, the sintered body comprising the b) electrically conducting oxide as a chief component has an excellent resistance against the oxidation, and is capable of preventing the occurrence of phenomena such as a drop in the generation efficiency or generation impossible due to an increase in the electrode resistance of the anode layer caused by the oxidation of the anode layer and peeling of the anode layer from the solid electrolytic layer. As the electrically conducting oxide, further, there can be preferably used nickel oxide in which lithium is solidly dissolved. By further blending the above material with a metal which is an element of the platinum group or an oxide thereof, there can be obtained a good generation performance.

It is desired that the anode layer is formed porous in addition to being supported by the electrically conducting mesh as described above. Being supported by the electrically conducting mesh, the anode layer exhibits a high resistance against thermal shocks and is not cracked even by a sharp change in temperature. The effect is further improved by imparting porosity thereto. The porosity of the porous solid electrolytic layer can be widely varied and, usually, is from about 10 to about 60% and, more desirably, from about 20 to about 40%.

Further, the thickness of the anode layer (inclusive of the thickness of the electrically conducting mesh) can be widely varied but is basically greater than the thickness of the solid electrolytic layer. The anode layer has a thickness which is, usually, about 60 to about 200 μm and, preferably, about 80 to about 120 μm. When the anode layer is too thin, the function of the anode layer itself is not obtained arousing a problem such as a decreased output as a result of insufficient anode reaction despite the electricity is effectively collected while using the material for collecting electricity in decreased amounts owing to the presence of the electrically conducting mesh.

The anode layer can be formed by using any technology that is commonly used for forming thin films and films. For example, an electrically conducting mesh having a desired form and a size is produced or is obtained from the market. Thereafter, a paste for forming the anode layer is applied onto the surface of the electrically conducting mesh in a predetermined pattern, dried and is fired to easily form the anode layer. A printing method such as a screen printing method can be advantageously used for applying the paste. The anode layer can be advantageously produced by printing the paste for forming the anode layer in a predetermined pattern, effecting the drying as required, further, printing a paste of the solid electrolytic material onto the surface thereof in a predetermined pattern and, finally, firing the unfired anode layer, solid electrolytic layer and cathode layer at one time. As described above, the green sheet process offers a noticeable effect such as greatly shortening the process for producing the fuel cell unit.

Similarly, in the practice of the present invention, the cathode layer is not restricted to a specific one. The cathode layer may be formed from the conventional cathode materials which include, but are not restricted to, manganic acid, gallium acid or cobalt acid compounds of the third group element of the periodic table such as lanthanum having added thereto strontium (Sr), for example, lanthanum strontium manganite, lanthanum strontium cobaltite, samarium strontium cobaltite and the like.

It is desired that the cathode layer is formed to be porous in addition to being supported by the electrically conducting mesh as described above. Being supported by the electrically conducting mesh, the cathode layer exhibits a high resistance against thermal shocks and is not cracked even by a sharp change in the temperature. The effect is further improved by imparting porosity thereto. The porosity of the porous solid electrolytic layer can be widely varied and, usually, is from about 10 to about 60% and, more desirably, from about 20 to about 40%.

Further, the thickness of the cathode layer (inclusive of the thickness of the electrically conducting mesh) can be widely varied but is basically greater than the thickness of the solid electrolytic layer. The cathode layer has a thickness which is, usually, about 60 to about 200 μm and, preferably, about 80 to about 120 μm. When the cathode layer is too thin, the function of the cathode layer itself is not obtained arousing a problem such as a decreased output as a result of insufficient cathode reaction despite the electricity is effectively collected while using the material for collecting electricity in decreased amounts owing to the presence of the electrically conducting mesh.

The cathode layer can be formed by using any technology that is commonly used for forming thin films and films. For example, an electrically conducting mesh having a desired form and a size is produced or is obtained from the market. Thereafter, a paste for forming the cathode layer is applied onto the surface of the electrically conducting mesh in a predetermined pattern, dried and is fired to easily form the cathode layer. A printing method such as a screen printing method can be advantageously used for applying the paste. Like the anode layer, the cathode layer, too, can be advantageously produced by printing the paste for forming the cathode layer in a predetermined pattern, effecting the drying as required, further, printing a paste of the solid electrolytic material onto the surface thereof in a predetermined pattern and, finally, firing the unfired anode layer, solid electrolytic layer and cathode layer at one time. As described above, the green sheet process offers a noticeable effect such as greatly shortening the process for producing the fuel cell unit.

In addition, in the fuel cell of the present invention, the cell unit may be completed by using a single member or may be completed by a combination of two or more small members. That is, in a preferred embodiment of the invention, the fuel cell unit can be formed by using a single cell member that includes the solid electrolytic layer, the anode layer with the electrically conducting mesh and the cathode layer with the electrically conducting mesh. The constitution of the fuel cell unit and the production thereof using the single cell member can be easily understood from the above description.

According to another preferred embodiment of the invention, the fuel cell unit may comprise a combination of a plurality of sectionalized cell members arranged being divided in the longitudinal direction, in the transverse direction or in both the longitudinal and transverse directions, and each including the solid electrolytic layer, the anode layer with the electrically conducting mesh and the cathode layer with the electrically conducting mesh. In the case of the above fuel cell unit, the desired fuel cell unit is completed by electrically connecting the sectionalized cell members in series or in parallel.

The present invention can be advantageously carried out in a variety of methods by connecting, in series or in parallel, a plurality of sectionalized cell members arranged neighboring each other. For example, the electrically conducting mesh of the anode layer of a given sectionalized cell member and the electrically conducting mesh of the cathode layer of another sectionalized cell member neighboring the above sectionalized cell member can be advantageously connected together via the electrically conducting mesh (connection means) arranged extending through the gap between the above sectionalized cell members. Here, the electrically conducting mesh used as the connection means may be the electrically conducting mesh of the anode layer, the electrically conducting mesh of the cathode layer or a third electrically conducting mesh different from the above electrically conducting meshes. It is advantageous from the standpoint of workability and cost of production if the electrically conducting mesh of the anode layer, the electrically conducting mesh of the cathode layer and the electrically conducting mesh of the connection means have a common shape and size. The electrically conducting meshes can be connected together by any bonding method depending upon the material of the electrically conducting meshes and the like. For example, a spot welding method can be advantageously used when the electrically conducting mesh comprises a metal mesh.

The thus constituted fuel cell unit of the present invention can be used for the fuel cells of various types. The fuel cells advantageous for putting the invention into practice include the direct-flame fuel cell in which the fuel cell unit is arranged in or near the flame so as to be exposed to the flame to generate electricity, and a single-chamber fuel cell in which the fuel cell unit is arranged in an atmosphere of a mixed fuel gas of a gaseous fuel and oxygen or an oxygen-containing gas to generate electricity relying upon a potential difference that takes place between the anode layer and the cathode layer.

First, described below is the direct-flame fuel cell in which the fuel cell unit is arranged in or near the flame produced by the combustion of a solid fuel, a liquid fuel or a gaseous fuel so as to be exposed to the flame to generate electricity. Here, "near the flame" stands for such a positional relationship that the flame stemming from the fuel that is used comes in uniform contact with the fuel cell unit to generate electricity as desired. When, for example, a gaseous fuel is used, the end of the gas burner is located near the fuel cell unit and, particularly, near the anode layer, and the flame released from the combustion port comes into uniform contact with the fuel cell unit to generate electricity as desired.

The solid fuel suited for putting the invention into practice includes various fuels that are usually used as fuels. Preferred examples of the solid fuel include wood, biomass resources, paraffin solid fuels and alcoholic solid fuels, which may be used in one kind or being mixed together in two or more kinds. The solid fuel can be used in various forms, such as blocks, chips, pellets and powders. Wood pellets are inexpensive and can be recycled, and serve as a solid fuel suited for putting the invention into practice. If necessary, any liquid fuel may be additionally used in combination to assist the combustion of the solid fuel.

Examples of the liquid fuel suited for putting the invention into practice are not limited to those described below but include gasoline type fuels such as butane, hexane, heptane and octane, alcohols such as methanol, ethanol and propanol, and ketones such as acetone and the like. These liquid fuels, too, may be used by being mixed together if necessary.

Examples of the gaseous fuel suited for putting the invention into practice are not limited to those described below but include hydrocarbon gases such as methane, ethane, propane and butane. These gaseous fuels are usually used in one kind but may be used being mixed together in two or more kinds if necessary. These gaseous fuels can be supplied to the fuel cell from the gas cylinder, liquefied gas container and city gas line, and can be burned by using a combustion instrument such as a gas burner attached to the fuel cell.

The flame stemming from the combustion of the fuel may be a diffusing flame or a pre-mixed flame. Here, however, the diffusing frame is not stable and the function of the anode layer tends to be decreased by the generation of soot. Therefore, the pre-mixed flame is preferred. The pre-mixed flame is stable enabling the size of the flame to be adjusted, which is advantageous. Besides, the concentration of fuel can be adjusted to prevent the occurrence of soot.

In the fuel cell of the invention, the fuel is disposed at a given position in the combustion chamber and is burned. For example, the solid fuel or the liquid fuel can be burned being disposed on the bottom of the combustion chamber. When the gaseous fuel is used, a nozzle or a burner may be disposed on the bottom of the combustion chamber to burn the fuel, or the nozzle or the burner may be disposed being directed downward at the vertex of the combustion chamber to burn the fuel.

The fuel cell unit, too, may be arranged at a given position in the combustion chamber to generate electricity. Generally, the fuel cell unit can be arranged in or over the flame in the combustion chamber, or the fuel cell unit is arranged on the side surface of the combustion chamber. Advantageously, further, the combustion chamber is formed in a cylindrical shape, and the wall (side wall) of the combustion chamber is defined by the fuel cell unit. In this case, the wall itself of the combustion chamber may be the fuel cell unit. Or, the fuel cell unit may be stuck or attached to the wall made of, for example, a stainless steel.

In the practice of the invention, it is advantageous if the combustion chamber that produces the flame by burning the fuel has the shape of a cylinder as described above. Here, the "cylinder" stands for an ordinary cylindrical shape, but may be a cube or a cylinder of any other shape if it is necessary from the design and use of the fuel cell. Basically, it is desired that the cylinder has a structure of which the upper portion is opened from the standpoint of effectively utilizing the waste heat of the exhaust gas produced by the combustion. The opening at the upper portion is of a circular shape if the combustion chamber is a cylinder.

In the present invention, the combustion chamber does not simply work as a combustion chamber as in the conventional fuel cell but, besides, the wall of the combustion chamber defines "the fuel cell unit" which is the heart of the fuel cell. As described above, the fuel cell unit is constituted by the anode layer with the electrically conducting mesh, the cathode layer with the electrically conducting mesh and the solid electrolytic layer in the form of a thin film held being sandwiched between these electrode layers. Various actions and effects that were not so far estimated can now be expected by constituting the wall of the combustion chamber relying upon the fuel cell unit according to the present invention. For instance, upon employing a structure in which the fuel cell unit is arranged on nearly the whole wall of the combustion chamber, it needs not be pointed out that the electromotive time can be shortened, the structure can be simplified, the apparatus can be realized in a small size and the cost can be lowered and, besides, the anode reaction can be very efficiently carried out between the flame and the fuel cell unit. This is because the flame can be brought into uniform contact with the anode layer of the fuel cell unit to efficiently utilize hydrocarbons, hydrogen, and radicals (OH, CH, $C_2$, $O_2H$, $CH_3$, etc.).

In the practice of the invention, further, it is advantageous if the wall of the combustion chamber is so constituted as to possess a composite wall structure of at least two layers forming a gap between the layers to permit the flow of the air instead of a single wall structure that has heretofore been generally employed in the conventional fuel cells. When the above composite wall structure is employed, it is desired that the fuel cell structure of the present invention forms at least the wall of the innermost layer that is in contact with the combustion chamber among a plurality of walls constituting the wall of the combustion chamber. In the case of the fuel cell of the present invention, further, the wall has a composite structure of two or more layers and, hence, the fresh air present outside the wall of the outermost layer constituting the wall can be passed through the air guide passage formed between the neighboring walls, heated and supplied to the combustion chamber.

The composite wall structure of the combustion chamber will be further described. In the case of the fuel cell of the present invention, it is desired that the wall of the innermost layer in contact with the combustion chamber comprises at least the fuel cell unit. As desired, further, the second, third, . . . layers (walls) as counted from the inner side may comprise the fuel cell unit. In either case, the composite wall structure must form an air guide passage between the neighboring walls maintaining a gap of a size large enough for the air introduced from the outer side to flow. Being constituted as described above, the air passing through the air guide passage is gradually heated before it is sent into the combustion chamber and, thus, effectively utilizing the pre-heated air for the cathode reaction avoiding such an inconvenience that the cold air is directly fed into the combustion chamber to quickly cool the fuel cell unit.

When the fuel cell unit is used for the wall of the combustion chamber in the fuel cell of the invention, the combustion chamber can be variously modified within the scope of the invention to improve the structure and performance of the fuel cell. For example, the combustion chamber may be provided with one or more air supply ports at arbitrary positions to take part in the combustion of the fuel and to introduce the air in ample amounts so as to be fed to the anode layer. It is desired that the air supply ports are, generally, provided at a lower end portion of the wall of the combustion chamber (cylinder).

The wall of the combustion chamber is not only provided with the air supply ports as described above but may further have one or more air infiltration holes or slits for assisting the supply of the air. For example, the air infiltration holes can be formed by piercing through a plurality of fine holes maintaining a gap in the wall at arbitrary positions. Similarly, the slits can be formed by cutting a plurality of slender notches maintaining a gap in the wall at arbitrary positions. Further, when the fuel cell unit is constituted by a combination of a plurality of sectionalized cell members, the gaps among the neighboring sectionalized cell members can be utilized as slits.

Further, in order to assist the supply of the air to the combustion chamber and, particularly, to supply the fresh air thereto at all times, it is desired to provide the combustion chamber with an air-blowing mechanism such as an air fan or a blower. It is desired that the air-blowing mechanism is arranged near the air intake port to guarantee a forced supply of the air.

Furthermore, the wall of the combustion chamber defining the fuel cell unit may have a cylindrical heat-insulating wall surrounding the chamber wall and the bottom wall. The heat-insulating wall can be formed by using various heat-insulating materials in any thickness, and can be stuck to the outer wall of the combustion chamber with a sticking material or can be attached thereto by mechanical means. Suitable examples of the heat-insulating material may include, for example, glass wool and the like.

As described above, the fuel cell according to the present invention may be a single-chamber fuel cell in which the fuel cell unit is arranged in an atmosphere of a mixed fuel gas of a gaseous fuel and oxygen or an oxygen-containing gas to generate electricity based on a potential difference taking place between the anode layer and the cathode layer. The single-chamber fuel cell, too, can be used in various forms like the above direct-flame fuel cell. In the single-chamber fuel cell, in particular, it is desired that a plurality of fuel cell units are contained in a chamber being stacked in the form of a multi-layer cell structure, and the anode layers and the cathode layers neighboring each other are directly joined to each other.

According to a preferred embodiment, the fuel cell unit is contained in the chamber in a manner that the anode layer and the cathode layer of the fuel cell unit are in parallel with the direction in which the mixed fuel gas flows, the cathode layer and the anode layer being porous layers having numerous fine pores formed therein to permit the mixed fuel gas to pass through, and the solid electrolytic layer having a dense structure without substantially permitting the mixed fuel gas to pass through.

According to another preferred embodiment, the fuel cell unit is contained in the chamber in a manner that the anode layer and the cathode layer of the fuel cell unit are at right angles to the direction in which the mixed fuel gas flows, the cathode layer, the anode layer and the solid electrolytic layer being porous layers having numerous fine pores formed therein to permit the mixed fuel gas to pass through.

In the fuel cell having a multi-layer fuel cell unit as described above, further, it is advantageous if the space in the chamber excluding the multi-layer fuel cell unit is filled with a filler, the gaps in the filler being such that the mixed fuel gas will not be ignited, even if it is within an igniting limit, to prevent an explosion of the mixed fuel gas. That is, in the fuel cell containing the fuel cell unit in the chamber that is forms ports for feeding and exhausting the mixed fuel gas containing the fuel gas such as methane and oxygen, it is desired that the space in the chamber where the mixed fuel gas and the exhaust gas flow is filled with the filler except the portion where the fuel cell unit is contained in the chamber, the gaps in the filler being such that the mixed fuel gas will not be ignited when the fuel cell is driven despite the mixed fuel gas exists within an igniting limit in the space.

In the fuel cell, the gaps in the filler filled in the space in the chamber are selected to be narrower than a distance for extinguishing the flame of the mixed fuel gas in the space when the fuel cell is driven, to reliably prevent the ignition of the mixed fuel gas in the space. Further, a maximum gap in the filler is selected to be smaller than a diameter for extinguishing the flame to prevent the detonation of the mixed fuel gas in the space when the fuel cell is driven and to prevent the detonation even if the mixed fuel gas is ignited in the space. Further, the portion containing the fuel cell unit is provided with heating means and the space filled with the filler is provided with cooling means to further prevent the detonation in the space. Suitable examples of the filler may include particles of a metal material or a ceramic material, that remain stable under the conditions where the fuel cell is driven, porous materials and fine tubes.

As described above, the fuel cell uses a multi-layer fuel cell unit that is formed by stacking a plurality of fuel cell units in a manner that the neighboring anode layers and the cathode layers are directly joined together to take out a high voltage as desired. Further, when the multi-layer fuel cell unit is contained in the chamber in a manner that the anode layers and the cathode layers of the fuel cell units are in parallel with the direction in which the mixed fuel gas flows, the cathode layers and the anode layers are made of porous layers having numerous fine pores formed therein to permit the mixed fuel gas to pass through, and the solid electrolytic layers have a dense structure which does not substantially permit the mixed fuel gas to pass through. Further, when the multi-layer fuel cell unit is arranged in a manner that the anode layers and the cathode layers of the fuel cell units are at right angles with the direction in which the mixed fuel gas flows, the cathode layers, the anode layers and the solid electrolytic layers are made of porous layers having numerous fine pores formed therein to permit the mixed fuel gas to pass through, thus permitting the mixed fuel gas to pass through the multi-layer fuel cell unit without requiring the formation of other passages.

By constituting the fuel cell as described above, it is made possible to prevent the detonation in the space in the chamber excluding the fuel cell unit, to increase the concentration of oxygen in the mixed fuel gas or, in other words, to decrease the concentration of fuel to such a degree that the fuel in the mixed fuel gas is not carbonized. As a result, the cell performance is prevented from being lowered by the progress of carbonization of fuel in the mixed fuel gas.

Moreover, the fuel cell according to the present invention may comprise a single fuel cell only or a combination of two or more fuel cell units each capable of functioning as the fuel cell of the invention. In particular, the fuel cell of the invention makes it easy to achieve an increased output in a predetermined size by combining a plurality of fuel cell units.

When constituted by a combination of a plurality of fuel cell units, the fuel cell of the invention can be put into practice in a variety of combinations. For example, a plurality of fuel cell units can be arranged all in a single casing. The plurality of fuel cell units used in combination may all have the same shape, constitution and size, or may have different shapes, constitutions and sizes. As required, various fuel cell units may be used in any combination and in any arrangement. Further, the plurality of fuel cell units may be used being contained in a casing, such as being fixed to a common substrate or in any other means.

The fuel cell of the invention is small in size, light in weight, produced at a low cost, requires little maintenance and, hence, can be advantageously used in a variety of fields. For example, the fuel cell of the present invention can be used for turning an LED on, for driving an LCD and for driving a portable radio or a portable information instrument. It can further be used as a power source in case of emergency, power failure and for outdoor activities.

The fuel cell of the invention will be further described with reference to the accompanying drawings. The illustrated fuel cells are merely some examples and their structures and sizes can be variously modified without departing from the scope of the invention as will be easily understood by people skilled in the art. Materials suited for forming the members for constituting the fuel cell were described above already, and are not described here again.

Figure 3:
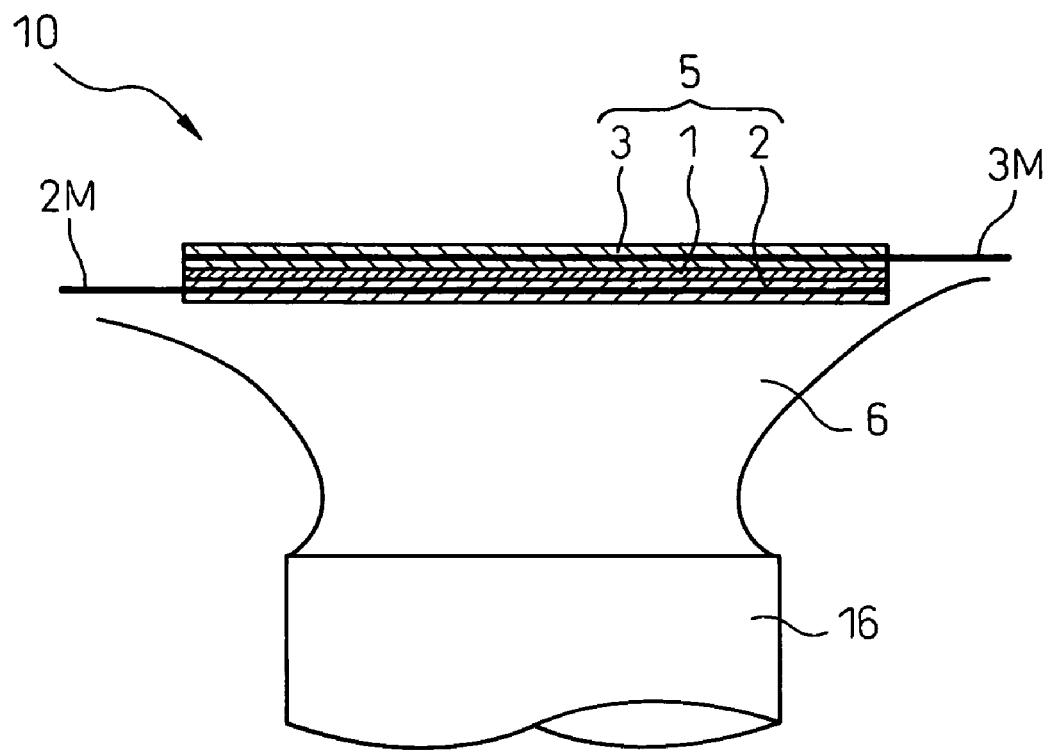
FIG. 3 is a side view illustrating a preferred embodiment of a direct-flame fuel cell according to the present invention.
Figure 4:
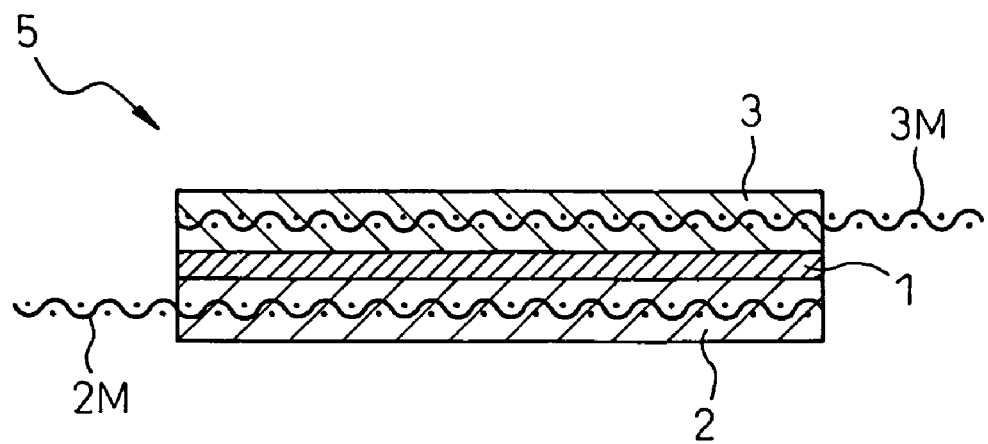
FIG. 4 is a sectional view illustrating, on an enlarged scale, a fuel cell unit in the fuel cell shown in FIG. 3.
Figure 5:
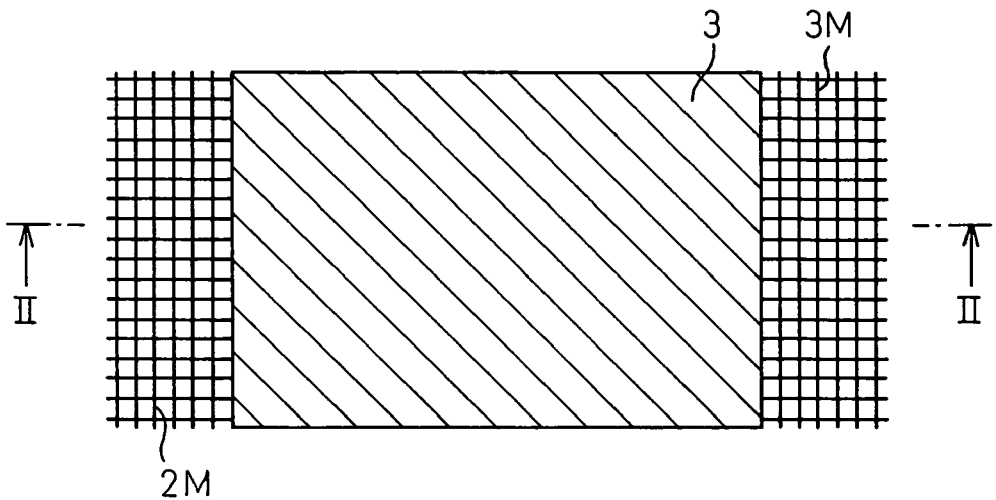
FIG. 5 is a plan view of the fuel cell unit shown in FIG. 4, FIGS. 6A to 6D each is a plan view illustrating a preferred embodiment of the fuel cell unit used in the fuel cell of the present invention.

FIG. 3 is a front view (sectional view illustrating a fuel cell unit only) of a solid oxide fuel cell according to a preferred embodiment of the present invention, FIG. 4 is a sectional view illustrating the fuel cell unit shown in FIG. 3 on an enlarged scale, and FIG. 5 is a plan view of the fuel cell unit shown in FIG. 4 (FIG. 4 is a sectional view taken along the line II-II in FIG. 5).

Referring to FIGS. 3 and 4, the fuel cell 10 of the invention is provided with a single flat-plate fuel cell unit (also referred to as a "cell member" in the invention) 5. The fuel cell unit 5 comprises a solid electrolytic layer 1, an anode layer 2 formed on a surface of the solid electrolytic layer 1 on the side of the flame, and a cathode layer 3 formed on a surface of the solid electrolytic layer 1 on the side opposite to the anode layer 2. As will be described later in detail, further, the anode layer 2 is supported by an electrically conducting mesh (metal mesh in this embodiment) 2M, and the cathode layer 3 is supported by a metal mesh 3M. As shown, the fuel cell unit 5 generates electricity by being disposed in a flame 6 or near the flame 6 with the anode layer 2 being faced to the flame 6 from a gas burner 16. The electric power generated by the fuel cell unit 5 is taken out through lead wires (not shown) drawn from the metal mesh 2M of the anode layer 2 and from the metal mesh 3M of the cathode layer 3. As the lead wires, there are advantageously used wires of platinum or an alloy thereof by taking heat resistance into consideration.

In the case of the illustrated fuel cell 10, the fuel cell unit 5 is formed as a flat plate and can be brought into uniform contact with the flame as compared to the tubular one. Besides, the anode layer 2 that is arranged facing the flame is advantageous since hydrocarbons, hydrogen and radicals (OH, CH, $C_2$, $O_2H$, $CH_3$) present in the flame can be used as fuels. Further, if the fuel cell unit is in the form of a flat plate, the flame can be completely interrupted as shown in FIG. 3, and the cathode layer 3 can be exposed in the atmosphere with the anode layer 2 being faced to the flame. This enables the cathode layer 3 to utilize oxygen in the atmosphere.

Though the fuel cell unit 5 is disposed in the flame or near the flame, it is more desired if it is disposed in the reducing flame which is near the root of the flame. Upon being disposed in the reducing frame, it is allowed to efficiently utilize hydrocarbons, hydrogen and radicals present in the reducing flame as fuels, making it possible to favorably use the anode layer that is subject to be deteriorated by oxidation and, hence, to maintain durability.

Referring to FIGS. 4 and 5, the anode layer 2 is supported by the metal mesh 2M and its one side is extended from the anode layer region and is exposed. Similarly, the cathode layer 3 is supported by the metal mesh 3M and its one side is extended from the cathode layer region and is exposed. The exposed regions of the form of tabs are useful for connecting the lead wires as described above and for connecting a plurality of fuel cell units (sectionalized cell members) together as will be described later in detail.

Figure 6A:
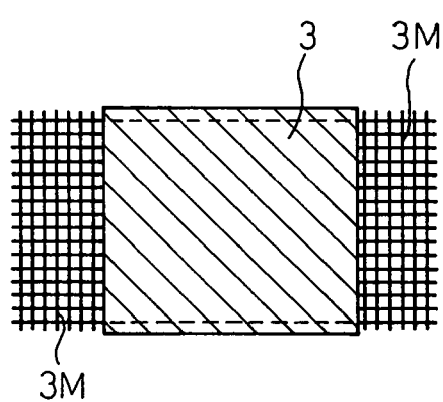
Figure 6B:
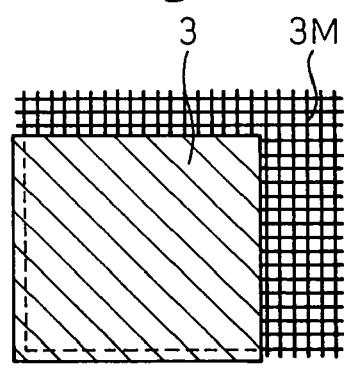
Figure 6C:
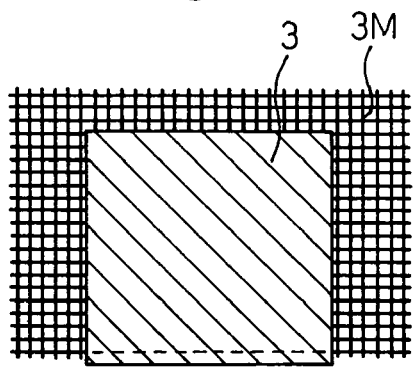
Figure 6D:
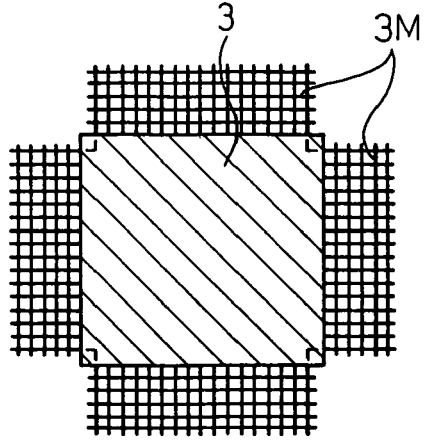

The cathode layer 3 will now be described with reference to FIGS. 6A to 6D. In the case of the fuel cell unit of the invention, the metal meshes of the anode layer and of the cathode layer can be extended in various forms beyond the electrode regions to form exposed regions. Referring, for example, to FIG. 6A, the metal mesh 3M may be extended from the two opposing sides of the cathode layer 3 of a rectangular shape to form exposed regions. Referring, further, to FIG. 6B, the metal mesh 3M may be extended from the two neighboring sides of the cathode layer 3 to form exposed regions. Referring, further, to FIG. 6C, the metal mesh 3M may be extended from the three neighboring sides of the cathode layer 3 to form exposed regions. Otherwise, as shown in FIG. 6D, the metal mesh 3M may be extended from all of the four sides of the cathode layer 3 to form exposed regions.

FIG. 7 is a sectional view illustrating the fuel cell units according to another preferred embodiment used in the fuel cell of the present invention. The fuel cell shown in FIGS. 3 to 5 illustrates the use of the single fuel cell unit. As required, however, the fuel cell unit may be divided into two or more members as shown in FIG. 7, and may be constituted in the form of a combination of a plurality of sectionalized cell members. In this case, the sectionalized cell members must be electrically connected as shown so as to function as the fuel cell units.

If described in further detail, FIG. 7 illustrates a method of connecting the sectionalized cell members of when the fuel cell units are constituted by a total of four sectionalized cell members. The drawings illustrate the sectionalized cell members in the form of flat plates for simple description. When the combustion chamber is a cylinder as described above, however, it is recommended to form the sectionalized cell members in a curved shape to form the cylinder.

As illustrated, the fuel cell units 5 include a plurality of sectionalized members $C_1$, $C_2$, etc. which are independently constituted, support the anode layers and the cathode layers by metal meshes made of the same material, and connect the anode layers (metal meshes) and the cathode layers (metal meshes) of the neighboring sectionalized cell members by using metal meshes made of the same material and passing through the gaps among the sectionalized cell members.

That is, the fuel cell units 5 are constituted by a plurality of sectionalized cell members $C_1$, $C_2$, etc. Each sectionalized cell member includes a solid electrolytic layer, an anode layer with a metal mesh and a cathode layer with a metal mesh. Referring, for example, to the sectionalized cell member $C_1$, an anode layer $2_1$ supported by a metal mesh $2M_1$ exists on one surface of a solid electrolytic layer $1_1$, and a cathode layer $3_1$ supported by a metal mesh $3M_1$ exists on the other surface. The metal mesh $2M_1$ of the sectionalized cell member $C_1$ and the metal mesh $3M_2$ of a neighboring sectionalized cell member $C_2$ are connected together through these metal meshes (designated at 24 for convenience). That is, the ends of the metal meshes $2M_1$ and $3M_1$ are connected together by, for example, spot welding. The metal mesh 24 is guided through a gap (slit) 15 between the sectionalized cell members $C_1$ and $C_2$. Thus, the plurality of sectionalized cell members $C_1$, $C_2$, etc. are connected in series. Further, a lead wire $W_1$ and a lead wire $W_2$ are connected to the cathode layer $3_1$ of the sectionalized cell member $C_1$ arranged first and to the anode layer of the sectionalized cell member arranged last.

FIG. 8 is a sectional view illustrating a further preferred embodiment of the fuel cell unit used in the fuel cell of the present invention. The fuel cell unit 5 shown here is the same as the fuel cell unit described above with reference to FIG. 7 except that the anode layers thereof are connected together in series, and the cathode layers thereof are also connected together in series. In this fuel cell of this invention, it will be understood that the fuel cell units are constituted by a plurality of sectionalized cell members expanding the degree of freedom for designing.

Figure 9:
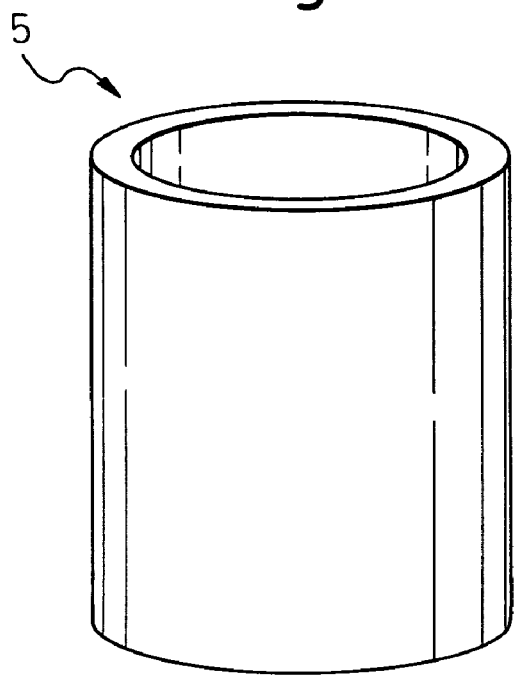
FIG. 9 is a perspective view illustrating a preferred embodiment of a cylindrical fuel cell unit used in the fuel cell of the present invention.

According to the fuel cell of the invention, as described above, the combustion chamber is formed like a cylinder, and the wall thereof is defined by the fuel cell unit to improve the generation efficiency, to decrease the size of the device and to decrease the weight. FIG. 9 is a perspective view illustrating an embodiment thereof. There are shown none of the solid electrolytic layer, anode layer or cathode layer in order to simplify the description. However, the fuel cell unit 5 that is shown is of a cylindrical shape, and burns fuel therein to generate electricity.

When the combustion chamber is formed as a cylinder, the fuel cell unit constituting the wall of the combustion chamber can be improved in a variety of ways. As required, for example, a plurality of air infiltration holes may be formed in the lower region of the wall of the combustion chamber. With the wall being provided with the air-infiltration holes, the air can be efficiently supplied into the combustion chamber so as to take part in the combustion of the fuel and so as to be supplied to the anode layer. Further, the wall may be provided with one or more slits in their place or in combination therewith. For example, longitudinally elongated slits may be formed in the wall at arbitrary positions.

Figure 10:
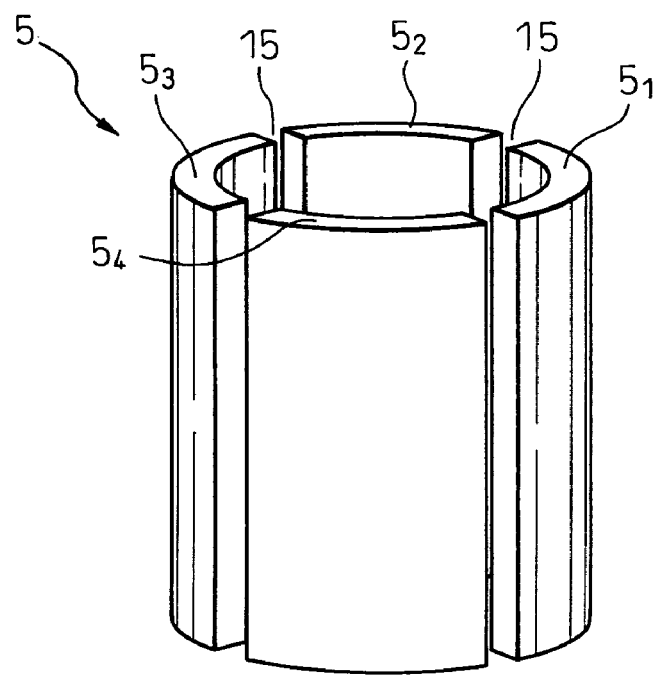
FIG. 10 is a perspective view illustrating another preferred embodiment of the cylindrical fuel cell unit used in the fuel cell of the present invention.

FIG. 10 illustrates another improvement of the cylindrical fuel cell unit. None of the solid electrolytic layer, anode layer or cathode layer is shown in order to simplify the description. The fuel cell unit 5 that is shown is divided into four in the longitudinal direction so as to be constituted by the sectionalized cell members $5_1$, $5_2$, $5_3$ and $5_4$. Though not shown, the sectionalized cell members have anode layers and cathode layers connected to each other by the connection method described above with reference to FIG. 5. That is, the connection means comprises metal mesh supporting the anode layers and the cathode layers and are passing through the gaps (slits) 15 formed among the neighboring sectionalized cell members. The gaps 15 further functions as the air infiltration holes for the combustion chamber.

As will be understood from the above description with reference to FIG. 10, the sectionalized cell members may be formed in a manner of dividing the wall in the longitudinal direction or dividing the wall in the transverse direction. Otherwise, the sectionalized cell members may be formed in a manner of dividing the wall in both the longitudinal and transverse directions. The sectionalized cell members may be connected in series or in parallel.

Figure 11:
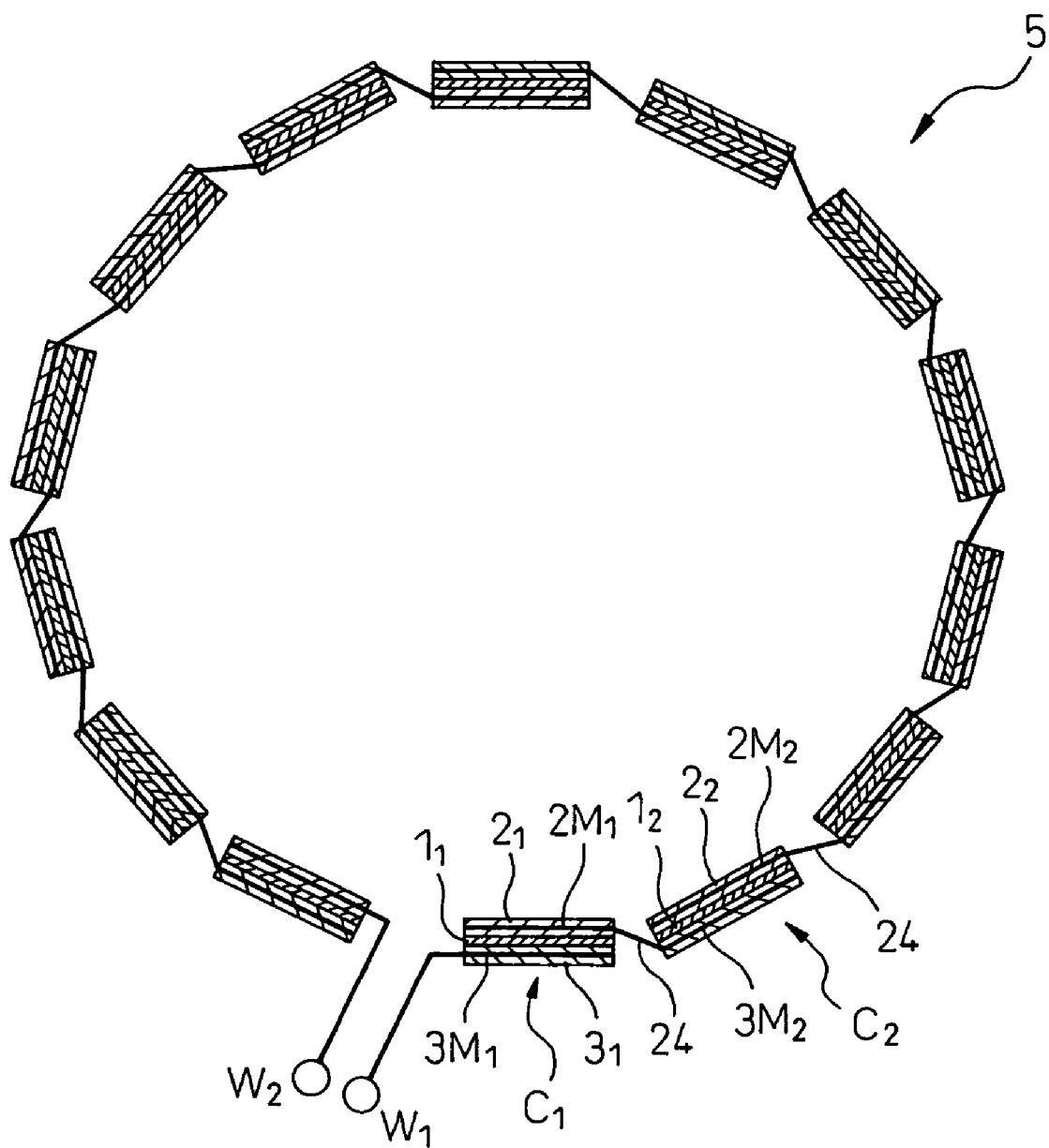
FIG. 11 is a sectional view illustrating a preferred embodiment of the cylindrical fuel cell unit formed by the combination of a plurality of sectionalized cell members.

FIG. 11 is a sectional view for more concretely illustrating the fuel cell unit of FIG. 10, and illustrates a state where a plurality of sectionalized cell members are arranged as a ring as described above to complete the fuel cell unit 5. That is, the connection portions among the neighboring sectionalized cell members are not formed in a plane surface of 180° but are angled to some extent to realize a structure in which an aggregate (fuel cell unit) of the sectionalized cell members is arranged in a cylindrical form as a whole.

That is, in this embodiment, the fuel cell units are constituted by a plurality of sectionalized cell members $C_1$, $C_2$, etc., and each sectionalized cell member is constituted by the solid electrolytic layer, the anode layer with the metal mesh and the cathode layer with the metal mesh. Further, the ends of the metal meshes supporting the anode layer and the cathode layer are abutted in the gap formed between the neighboring sectionalized cell members and are joined together by spot welding. Concretely, in the case of the sectionalized cell member $C_1$, the anode layer $2_1$ supported by the metal mesh $2M_1$ is formed on one surface of the solid electrolytic layer $1_1$ and the cathode layer $3_1$ supported by the metal mesh $3M_1$ is formed on the other surface. Next, the metal mesh $2M_1$ of the sectionalized cell member $C_1$ and the metal mesh $3M_2$ of the neighboring sectionalized cell member $C_2$ are abutted at their ends, joined together by spot welding and are connected together. Thus, the plurality of sectionalized cell members $C_1$, $C_2$, etc. are connected in series, and the lead wire $W_1$ and the lead wire $W_2$ are connected to the cathode layer $3_1$ of the sectionalized cell member $C_1$ arranged first and to the anode layer of the sectionalized cell member arranged last.

In the embodiment shown in FIG. 11, the single sectionalized cell members are successively connected in series in a portion of the cylinder in the circumferential direction thereof. It is, however, also allowable to arrange the plurality of sectionalized cell members in a portion of the cylinder in the axial direction, and connect part or all of them in parallel.

Figure 12:
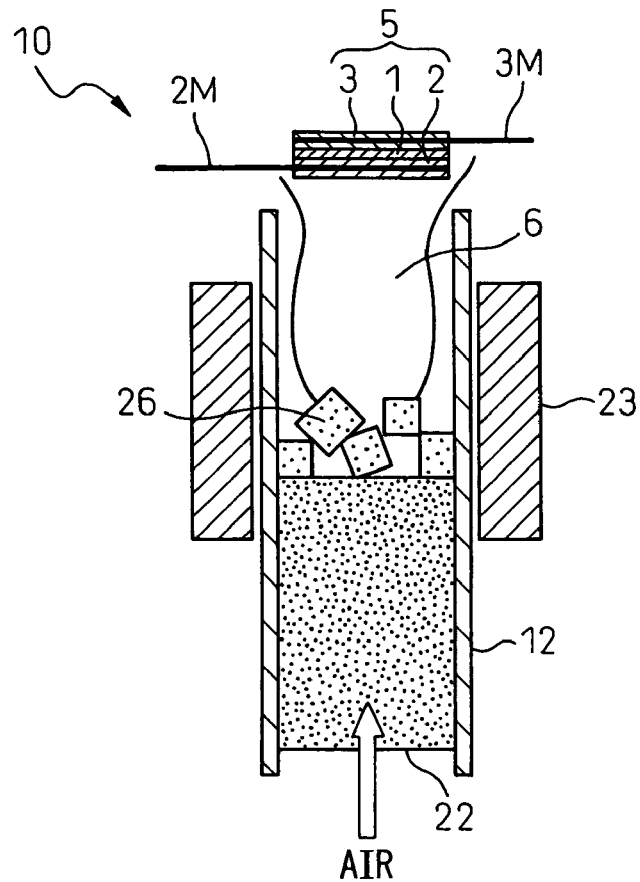
FIG. 12 is a sectional view illustrating another preferred embodiment of the direct-flame fuel cell according to the present invention.

FIG. 12 is a sectional view illustrating a preferred embodiment of a direct-flame fuel cell according to the present invention. The fuel cell 10 that is shown uses, as the fuel, a solid fuel (wood pellets) 26, and the fuel cell unit 5 according to the present invention is horizontally disposed over the flame 6 formed by the combustion. The fuel cell unit 5, as is described above with reference to FIGS. 3 to 5, is constituted by the solid electrolytic layer 1, the anode layer 2 supported by the metal mesh 2M formed on one surface thereof, and the cathode layer 3 supported by the metal mesh 3M formed on the other surface of the solid electrolytic layer 1.

The fuel cell 10 that is shown is provided with a combustion chamber of which the wall 12 is made of a heat-resistant material such as an alumina ceramic. The lower portion of the combustion chamber is filled with a porous member 22 instead of a fire grate that is often used for the direct-flame fuel cells. Further, a heater 23 which is heating means is provided on the upper outer periphery of the wall 12 of the combustion chamber. The fuel cell unit 5 is disposed at an upper opening of the combustion chamber in a manner that the anode layer 2 is on the lower side.

The solid fuel 26 is placed and contained in the heat resistant combustion chamber on the porous member 22. The solid fuel 26 is heated by the heater 23 while supplying the air into the combustion chamber via the porous member 22. For example, the heater 23 is energized and is heated up to about 500° C. while supplying the air at a suitably adjusted rate to the solid fuel 26. The volatile compound generated from the solid fuel 26 is burned to form the flame 6 which supplies radical components to the anode layer 2 of the fuel cell unit 5.

As described above, the heating means is provided on the outer periphery of the combustion chamber that contains the solid fuel therein and the air is supplied at a suitably adjusted rate into the combustion chamber making it possible to effectively take out the combustible volatile compound from the solid fuel without requiring any sophisticated apparatus for reforming the solid fuel. Therefore, the fuel cell unit can be exposed to the flame formed by burning the volatile compound contributing to increasing the amount of radical components supplied to the fuel cell unit and increasing the amount of electricity generated by the fuel cell.

Figure 13:
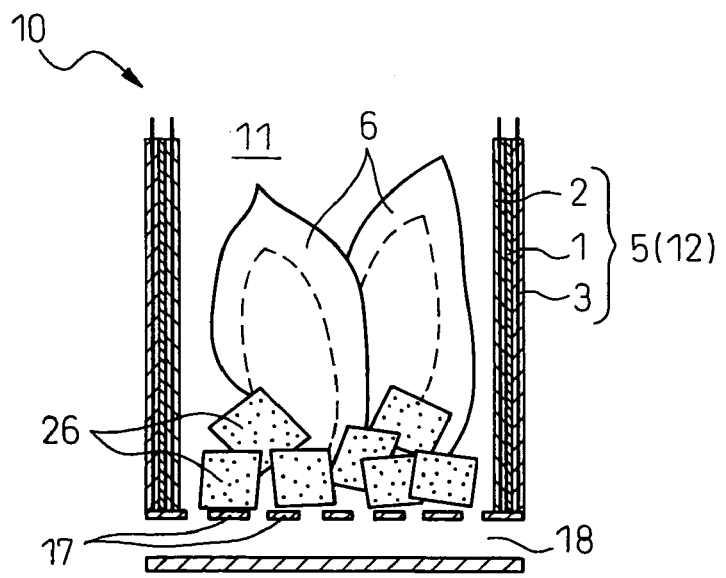
FIG. 13 is a sectional view illustrating a further preferred embodiment of the direct-flame fuel cell according to the present invention.

FIG. 13 is a sectional view illustrating another preferred embodiment of the direct-flame fuel cell according to the present invention. As shown, the fuel cell 10 has a wall 12 of a combustion chamber 11 constituted by a single cylindrical fuel cell unit 5. According to the present invention, the fuel cell unit 5 comprises the solid electrolytic layer 1, the anode layer 2 with the metal mesh formed on a surface of the solid electrolytic layer 1 on the side of the combustion chamber, and the cathode layer 3 with the metal mesh formed on a surface of the solid electrolytic layer 1 on the side opposite to the anode layer 2. Here, the combustion chamber 11 is a cylinder. As desired, however, it may be a cube or the like.

The combustion chamber 11 has a fire grate 17 made of cast iron attached to the bottom surface thereof. The fire grate 17 holds the solid fuel (wood pellets in the illustrated embodiment) 26 and feeds the external fresh air into the combustion chamber 11 through the air supply port 18. In the illustrated embodiment, there is provided the air supply port 18 having openings of an elliptic shape in the transverse direction to take out the ash of the solid fuel. The air supply port, however, may assume any other shape. Flame 6 is formed upon burning the solid fuel 26 and is brought into contact with the anode layer 2 of the fuel cell unit 5. As a result, electricity is generated due to the anode reaction stemming from the flame 6.

Figure 14:
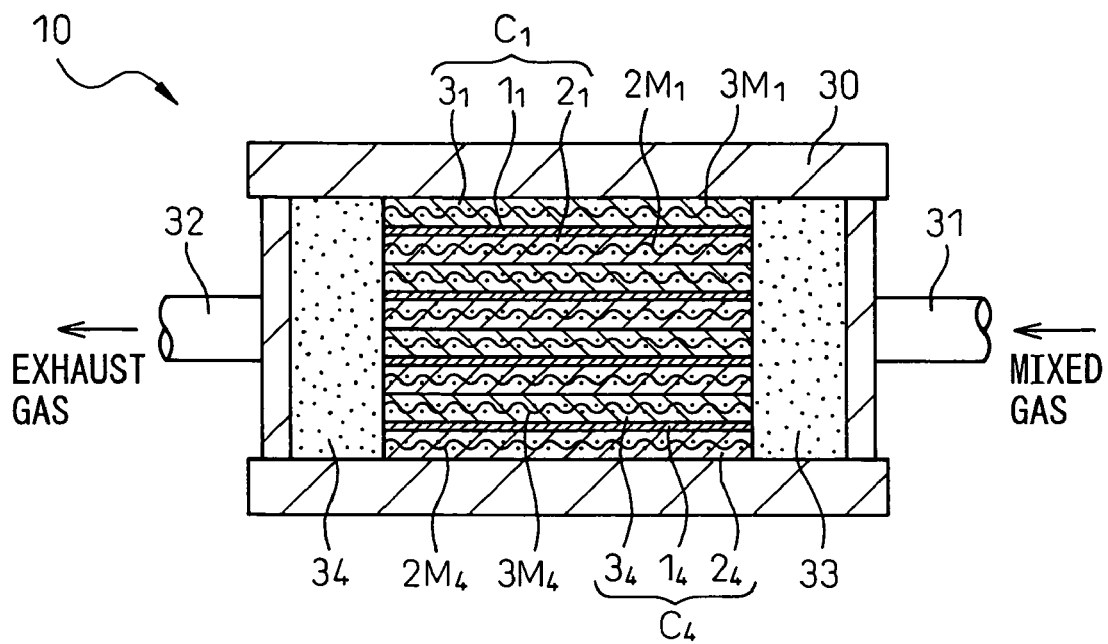
FIG. 14 is a sectional view illustrating a preferred embodiment of a single-chamber fuel cell according to the present invention.
Figure 15:
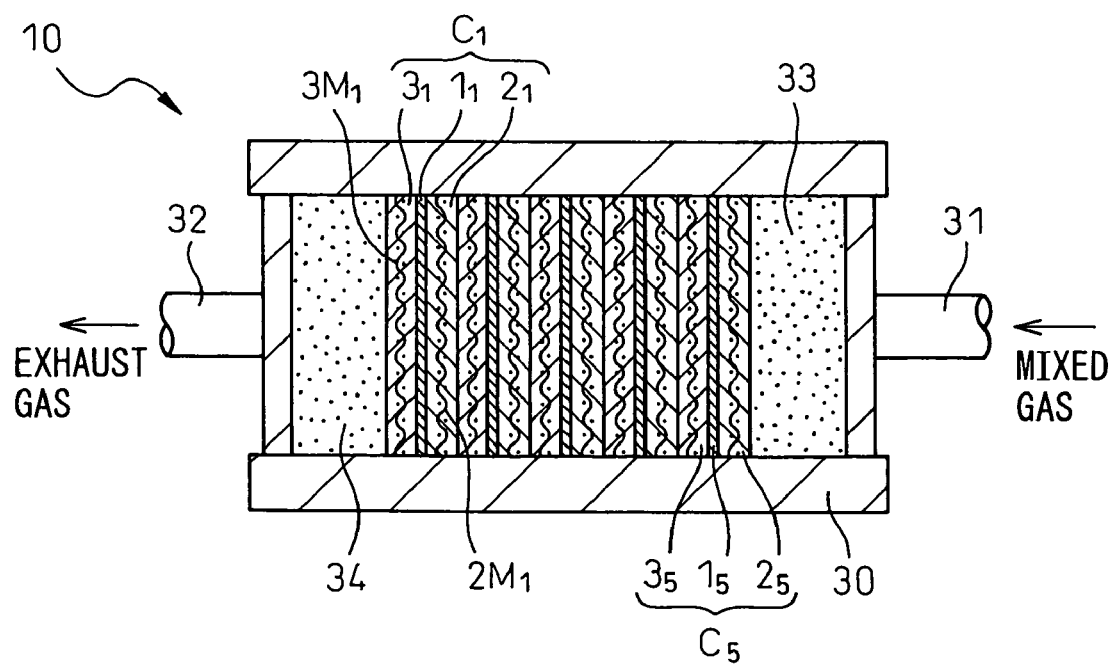
FIG. 15 is a sectional view illustrating another preferred embodiment of the single-chamber fuel cell according to the present invention.

FIGS. 14 and 15 are sectional views illustrating preferred embodiments of a single-chamber fuel cell according to the present invention.

The fuel cell 10 shown in FIG. 14 has a structure in which four fuel cell units $C_1, \ldots, C_4$ each having the solid electrolytic layer are stacked in parallel with the flow of the mixed fuel gas. The fuel cell unit $C_1$ will now be described. According to the present invention, the fuel cell unit $C_1$ comprises a solid electrolytic layer $1_1$, an anode layer $2_1$ with the metal mesh $2M_1$ formed on one surface of the solid electrolytic layer $1_1$ and a cathode layer $3_1$ with a metal mesh $3M_1$ formed on a surface of the solid electrolytic layer $1_1$ on the side opposite to the anode layer $2_1$. The fuel cell units $C_1, \ldots, C_4$ are contained in the ceramic chamber 30 being stacked. Further, fillers (ceramic particles) 33 and 34 are filled in spaces formed in the chamber at both ends of the fuel cell units. Further, the chamber 30 is provided with a feed pipe 31 for feeding a mixed fuel gas containing the fuel such as methane and oxygen and an exhaust pipe 32 for exhausting the gas. Spaces in the chamber 30 in which the mixed fuel gas and the exhaust gas flow are filled with the fillers 33 and 34 maintaining a suitable distance. When the fuel cell is driven, therefore, the mixed fuel gas that may exist within a limit of ignition is not ignited.

The fuel cell 10 shown in FIG. 15 is basically constituted in the same manner as the single-chamber fuel cell 10 shown in FIG. 14, but five fuel cell units $C_1, \ldots, C_5$ each including the solid electrolytic layer are stacked in the axial direction of the chamber 30 at right angles with the flow of the mixed fuel gas. In this fuel cell, too, the mixed fuel gas can be prevented from igniting like in the fuel cell of FIG. 14. The fuel cells shown in FIGS. 14 and 15 may basically utilize the constitutions disclosed in JP-A-2003-92124 except that the fuel cell units are modified according to the present invention.

Example

The present invention will be further described with reference to a working example. Note, however, that the present invention is not restricted to the example.

Production of the Direct-Flame Fuel Cell

A rectangular stainless steel wire gauze (SUS 304, 400 mesh) about 15 mm long, about 10 mm wide and about 100 μm thick was prepared, and on the surface thereof was screen-printed a paste of a cathode-forming material in a rectangular shape of about 10 mm long and about 10 mm wide. The paste used here was a mixed paste of SSC (samarium strontium cobaltite: $Sm_{0.5}Sr_{0.5}CoO_3$)—SDC (samaria-doped ceria: $Ce_{0.8}Sm_{0.2}O_{1.9}$) (composition ratio: 50% by weight—50% by weight). After printed, the paste was sufficiently dried to obtain a cathode mesh having a thickness of about 180 μm.

On the surface of a stainless steel wire gauze of the same material and of the same size as those described above, there was screen-printed a paste of an anode-forming material in a rectangular shape of about 10 mm long and about 10 mm wide. The paste used here was an NiO—SDC mixed paste (composition ratio: 60% by weight—40% by weight). After printed, the paste was sufficiently dried to obtain an anode mesh having a thickness of about 180 μm.

Thereafter, to form a solid electrolytic layer, a mixed paste of SSC (samarium strontium cobaltite: $Sm_{0.5}Sr_{0.5}CoO_3$)—SDC (samaria-doped ceria: $Ce_{0.8}Sm_{0.2}O_{1.9}$) (composition ratio: 10% by weight—90% by weight) was screen-printed onto the surface (paste-applying region) of the cathode mesh after drying in a rectangular shape of about 10 mm long and about 10 mm wide such that the cathode surface was completely covered, and was dried. Thereafter, the mixed paste of SSC—SDC same as the one described above was screen-printed again onto the solid electrolytic paste that has been dried, and was dried. The solid electrolytic layer after dried possessed a thickness of about 70 μm.

Thereafter, the anode mesh after drying was stuck onto the cathode mesh on which the solid electrolytic layer has been formed being brought into position on the paste-applying region, and was dried again. After drying, the cathode mesh—anode mesh aggregate that was obtained was introduced into a firing furnace and was fired in the atmosphere at a temperature of about 900° C. for about 3 hours. There was obtained a fuel cell unit as schematically illustrated in FIGS. 4 and 5.

The obtained fuel cell unit was disposed on the flame of an alcohol lamp and the anode layer of the fuel cell unit was exposed to the flame nearly uniformly and continuously. In this state, the fuel cell unit was examined for its behavior of power generation to make sure that the open-circuit voltage was about 0.5 V and the short-circuit current was stably about 130 mA. From the above measured results, it was learned that the fuel cell of this example is capable of stably feeding electric power.

The invention claimed is:

1. A solid oxide fuel cell comprising a fuel cell unit which comprises an anode layer made of a first electrically conducting mesh enclosed by an anode-forming material in such a way that the first electrically conducting mesh divides the anode-forming material into two sections, a cathode layer made of a second electrically conducting mesh enclosed by a cathode-forming material in such a way that the second electrically conducting mesh divides the cathode-forming material into two sections, and a solid electrolytic layer in the form of a thin film arranged between and supported by said anode layer and said cathode layer, wherein each of said first electrically conducting mesh and said second electrically conducting mesh has a thickness which is at least 30% of the total thickness of the carried anode layer and cathode layer, respectively, wherein each of said first electrically conducting mesh and said second electrically conducting mesh further has an exposed region that is extending outward from the region of the carried anode layer and cathode layer to an outside of the solid oxide fuel cell, respectively, and wherein, as compared to the thickness of said anode layer or said cathode layer, the thickness of the thin film solid electrolytic layer is substantially smaller than the total thickness of each of the anode layer and the cathode layer.

2. A fuel cell according to claim 1, wherein each of said first electrically conducting mesh and said second electrically conducting mesh is a mesh of a metal material, a mesh of a carbonaceous material or a combination thereof.

3. A fuel cell according to claim 2, wherein said metal material is platinum, iron, copper, nickel, titanium or an alloy thereof, a stainless steel, or nichrome.

4. A fuel cell according to claim 2, wherein said carbonaceous material is a carbon fiber or a graphite fiber.

5. A fuel cell according to claim 1, wherein each of said first electrically conducting mesh and said second electrically conducting mesh has a size of opening of 80 to 500 meshes.

6. A fuel cell according to claim 1, wherein each of said first electrically conducting mesh and said second electrically conducting mesh has a wire diameter of 0.02 to 2.00 mm.

7. A fuel cell according to claim 1, wherein each of said first electrically conducting mesh and said second electrically conducting mesh has a thickness of 50 to 300 μm.

8. A fuel cell according to claim 1, wherein said anode layer and said cathode layer have planes of a rectangular shape, respectively, and each of said first electrically conducting mesh and said second electrically conducting mesh is extending out of the layers from at least one side among the four sides thereof.

9. A fuel cell according to claim 1, wherein said solid electrolytic layer is porous and has a porosity of 10 to 60%.

10. A fuel cell according to claim 1, wherein said fuel cell unit comprises a single cell member which comprises the solid electrolytic layer, the anode layer and the cathode layer.

11. A fuel cell according to claim 1, wherein said fuel cell unit comprises a combination of a plurality of sectionalized cell members which are arranged being divided in the longitudinal direction, in the transverse direction or in both the longitudinal and transverse directions, each sectionalized cell member comprising the solid electrolytic layer, the anode layer and the cathode layer, and the sectionalized cell members being electrically connected together in series or in parallel with each other.

12. A fuel cell according to claim 1, wherein said fuel cell is a direct-flame fuel cell in which said fuel cell unit is arranged in or near the flame produced by burning a solid fuel, a liquid fuel or a gaseous fuel, and which generates electricity by being exposed to the flame.

13. A fuel cell according to claim 12, wherein said fuel is burned by being arranged in the bottom portion of a combustion chamber, said combustion chamber is formed in a cylindrical shape, and the wall of said combustion chamber is defined by said fuel cell unit.

14. A fuel cell according to claim 13, wherein said fuel cell unit comprises a combination of a plurality of sectionalized cell members, and the electrically conducting mesh of the anode layer of a given sectionalized cell member and the electrically conducting mesh of the cathode layer of another sectionalized cell member neighboring said sectionalized cell member, are connected together through the electrically conducting mesh of said anode layer and (or) of said cathode layer that is extending passing through a gap between said sectionalized cell members.

15. A fuel cell according to claim 1, wherein said fuel cell is a single-chamber fuel cell in which said fuel cell unit is arranged in an atmosphere of a mixed fuel gas of a gaseous fuel and oxygen or an oxygen-containing gas, and the electricity is generated based on a potential difference that takes place between said anode layer and said cathode layer.

16. A fuel cell according to claim 15, wherein a plurality of said fuel cell units are contained in a chamber in a stacked manner, and the anode layers and the cathode layers neighboring each other are directly joined to each other.

17. A fuel cell according to claim 16, wherein said fuel cell units are contained in said chamber in a manner that the anode layers and the cathode layers of the fuel cell units are in parallel with the direction in which said mixed fuel gas flows, said cathode layers and said anode layers are porous layers having numerous fine pores formed therein through which said mixed fuel gas passes, and said solid electrolytic layer has a dense structure which does not substantially permit the passage of said mixed fuel gas.

18. A fuel cell according to claim 16, wherein said fuel cell units are contained in said chamber in a manner that the anode layers and the cathode layers of the fuel cell units are at right angles to the direction in which said mixed fuel gas flows, and said anode layers, said cathode layers and the solid electrolytic layers are porous layers having numerous fine pores formed therein through which said mixed fuel gas is allowed to pass.

19. A fuel cell according to claim 1, wherein said fuel cell comprises a combination of two or more fuel cell units each of which functions as a fuel cell.

\* \* \* \* \*